(12) United States Patent
Glasco et al.

(10) Patent No.: US 8,868,838 B1
(45) Date of Patent: Oct. 21, 2014

(54) MULTI-CLASS DATA CACHE POLICIES

(75) Inventors: David B. Glasco, Austin, TX (US);
Peter B. Holmqvist, Cary, NC (US);
George R. Lynch, Raleigh, NC (US);
Patrick R. Marchand, Apex, NC (US);
James Roberts, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1007 days.

(21) Appl. No.: 12/276,154

(22) Filed: Nov. 21, 2008

(51) Int. Cl.
*G06F 12/12* (2006.01)

(52) U.S. Cl.
USPC .......................................................... 711/133

(58) Field of Classification Search
USPC .......................................................... 711/133
See application file for complete search history.

(56) References Cited

U.S. PATENT DOCUMENTS

| 5,546,559 | A * | 8/1996 | Kyushima et al. ............ 711/133 |
| 7,027,064 | B2 * | 4/2006 | Lavelle et al. ................. 345/557 |
| 2002/0188809 | A1 | 12/2002 | Kershaw |
| 2005/0015463 | A1 | 1/2005 | Smith et al. |
| 2005/0251626 | A1 | 11/2005 | Glasco |
| 2006/0224830 | A1 | 10/2006 | Davis et al. |
| 2009/0113135 | A1 | 4/2009 | Cain et al. |
| 2009/0307434 | A1 | 12/2009 | Sivaramakrishnan et al. |
| 2010/0079454 | A1 | 4/2010 | Legakis et al. |

FOREIGN PATENT DOCUMENTS

| JP | 04-205041 A | 7/1992 |
| JP | 04-215151 A | 8/1992 |
| JP | 07-028706 A | 1/1995 |
| JP | 2002024088 A2 | 1/2002 |
| JP | 2004-145780 A | 5/2004 |
| KR | 10-2005-0000350 A | 1/2005 |

OTHER PUBLICATIONS

GB Examination Report, GB App. No. 0920187.2, dated Mar. 4, 2010.
Office Action in U.S. Appl. No. 12/256,378, mailed Apr. 7, 2011.
Korean Patent Office Action, Ser. No. KR 10-2009-112619, dated Mar. 28, 2011.

* cited by examiner

*Primary Examiner* — Matthew Bradley
*Assistant Examiner* — Ramon A Mercado
(74) *Attorney, Agent, or Firm* — Patterson & Sheridan, LLP

(57) ABSTRACT

One embodiment of the invention sets forth a mechanism for evicting data from a data cache based on the data class of that data. The data stored in the cache lines in the data cache is categorized based on data classes that reflect the reuse potential of that data. The data classes are stored in a tag store, where each tag within the tag store corresponds to a single cache line within the data cache. When reserving a cache line for the data associated with a command, a tag look-up unit examines the data classes in the tag store to determine which data to evict. Data that has a low reuse potential is evicted at a higher priority than data that has a high reuse potential. Advantageously, evicting data that belongs to a data class that has a lower reuse potential reduces the number of cache misses within the system.

21 Claims, 9 Drawing Sheets

MULTI-CLASS DATA CACHE POLICIES

BACKGROUND OF THE INVENTION

1. Field of the Invention

The present invention relates generally to the field of memory management and, more specifically, to multi-class data cache policies.

2. Description of the Related Art

One element of a memory subsystem within certain processing units is a Level 2 Cache memory (referred to herein as "L2 cache"). The L2 cache is a large on-chip memory that serves as an intermediate point between an external memory (e.g., frame buffer memory) and internal clients of the memory subsystem (referred to herein as the "clients"). The L2 cache temporarily stores data being used by the various clients. This data may be retrieved from or written to an external memory (referred to herein as "DRAM"). The clients may re-use data that is stored in the L2 cache while performing certain operations.

During a read operation, a client may request data from the L2 cache that is not currently stored in the L2 cache and, therefore, has to be retrieved from the DRAM. A read operation where the data has to be retrieved from the DRAM is processed in significantly more clock cycles than a read operation where the data is retrieved directly from the L2 cache. Thus, overall system performance may be severely impacted if data has to be retrieved from the DRAM for a significant number of read operations. However, since the memory space allocated to the L2 cache is limited, the data resident in the L2 cache needs to be routinely evicted to free up memory space for future read or write operations transmitted by the clients. If data resident in the L2 cache is not evicted frequently enough, then future read and write operations have to be stalled until there is space in the L2 cache to process those operations. Again, such a dynamic can significantly impact overall system performance.

Conventional eviction schemes usually implement a policy where the least recently used data is evicted from the cache. However, in certain systems, where the use patterns of data vary, such an approach may not strike the appropriate balance between evicting data quickly to make room for future read and write operations and allowing data to remain in the cache long enough to be reused so that data requests to the external memory can be avoided.

As the foregoing illustrates, what is needed in the art is a more efficient mechanism for determining which data should be evicted first from an intermediate cache, such as an L2 cache.

SUMMARY OF THE INVENTION

One embodiment of the present invention sets forth a method for evicting data from an intermediary cache coupled to one or more clients and to an external memory. The method includes the steps of receiving a command from a client that includes an associated memory address, identifying one or more cache lines within the intermediary cache to store data associated with the command based on the memory address, determining that there is a cache miss relative to the one or more cache lines, and causing at least part of the data residing in the one or more cache lines to be evicted, or stalling the command, based on one or more eviction classes associated with the data residing in the one or more cache lines, wherein each eviction class reflects a different likelihood that data associated with the eviction class will be reused by the client or a different client.

One advantage of the disclosed method is that the data class associated with the data stored in the data cache allows a tag look-up unit to evict data that is has the least likelihood for reuse when making room for the data associated with the incoming read or write command. This mechanism of evicting data reduces the number of cache misses resulting from the early eviction of data that may be reused by the clients within the system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
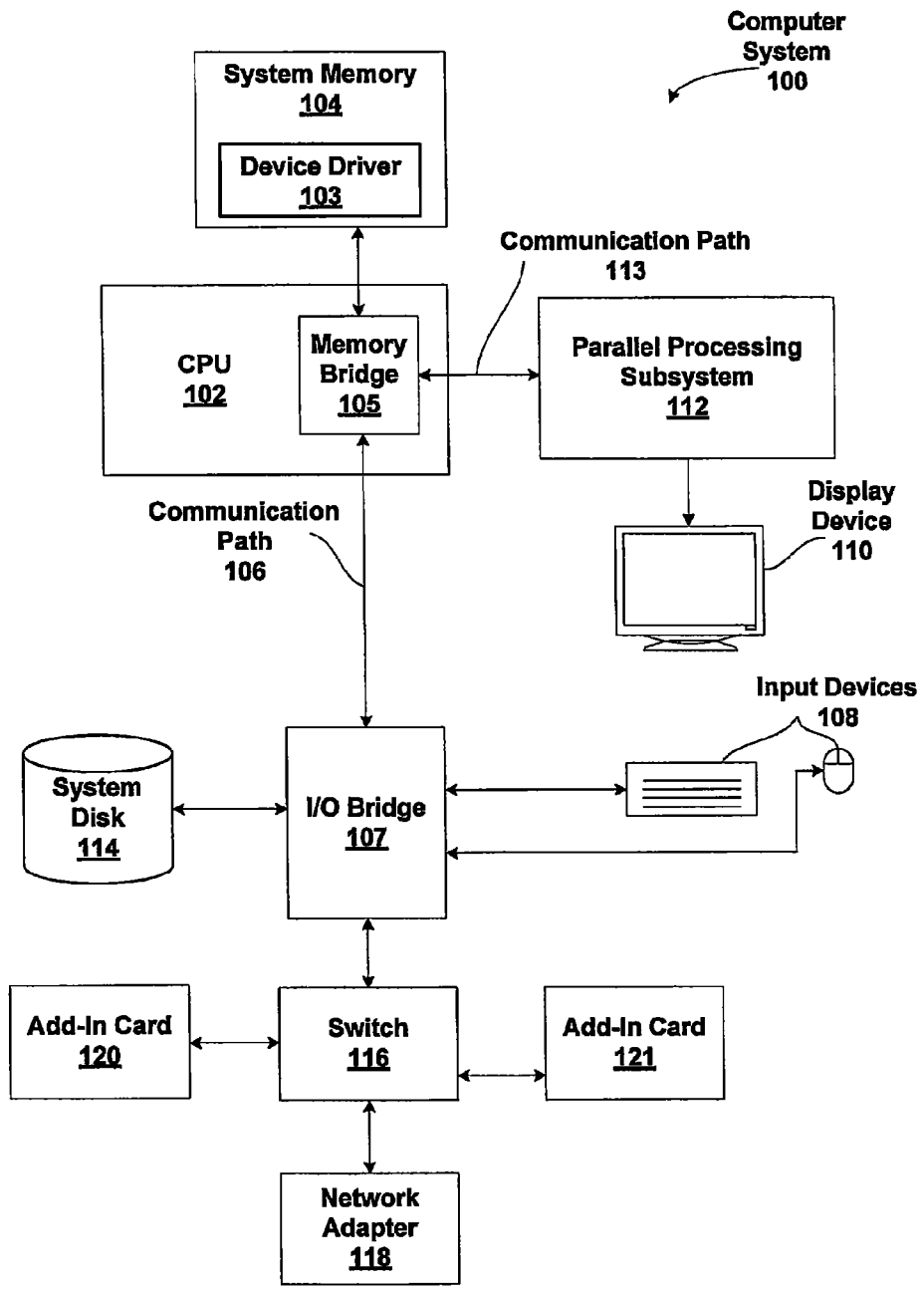
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
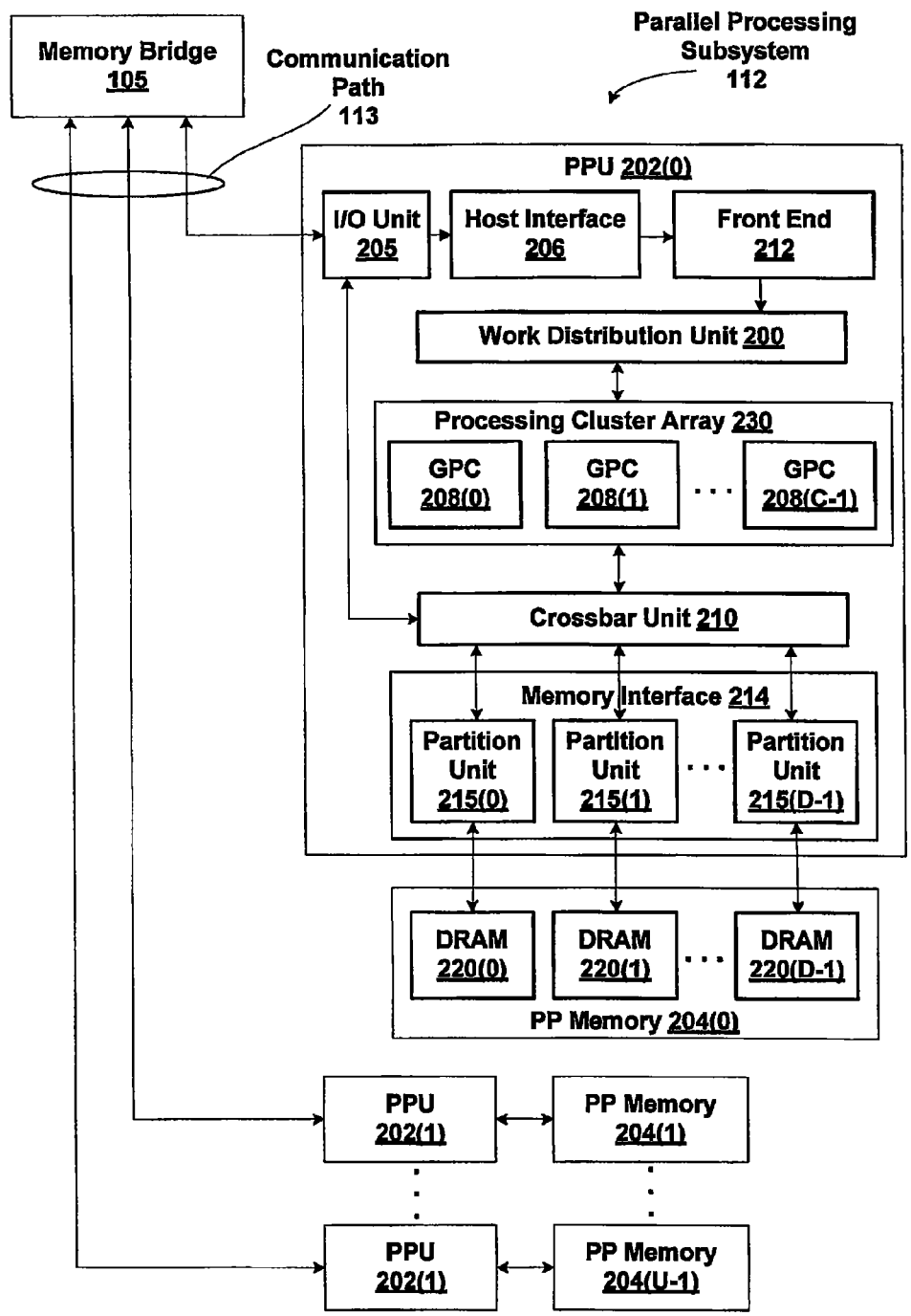
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
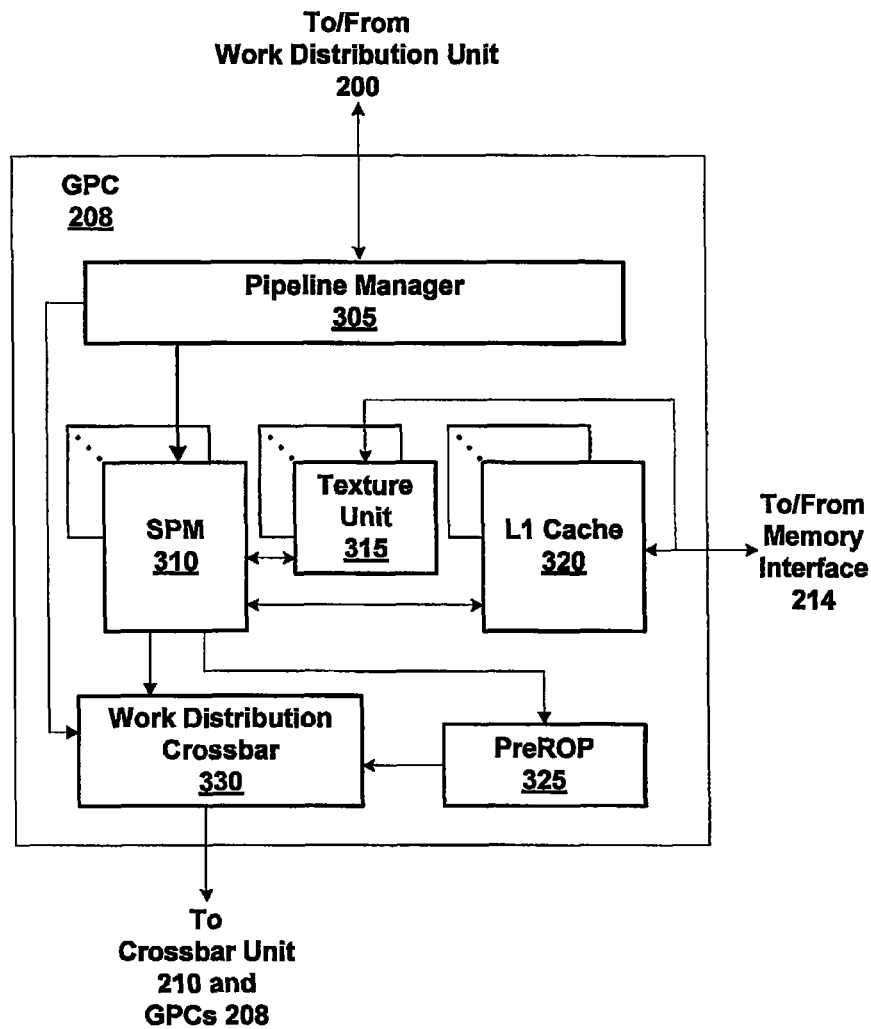
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
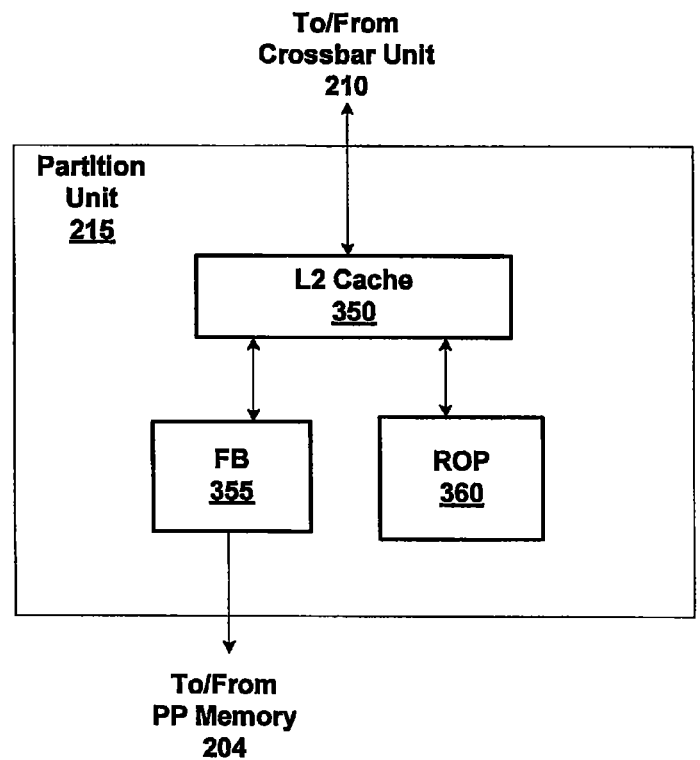
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Data Class Based Eviction Policies

Figure 4:
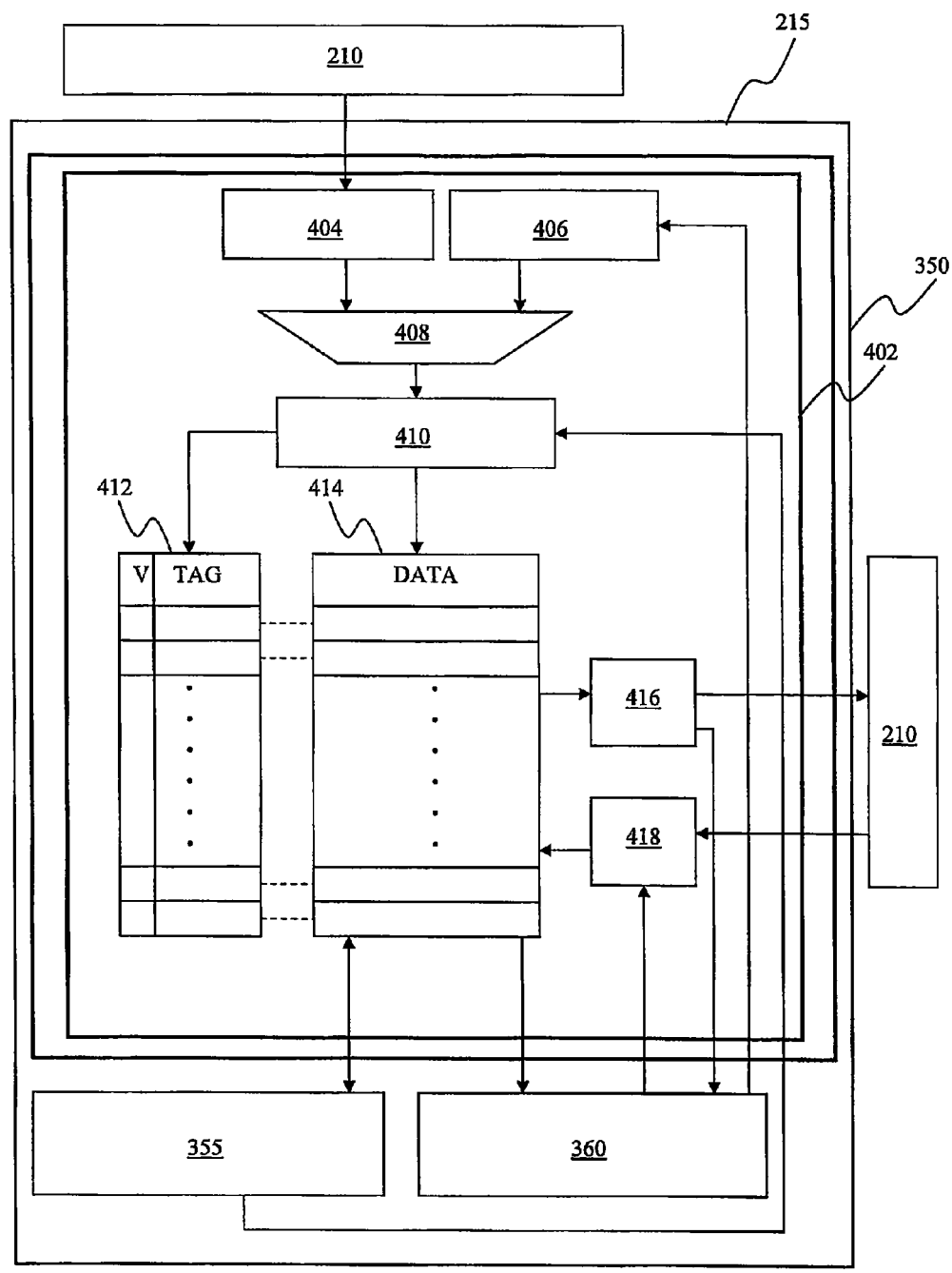
FIG. 4 is a detailed block diagram of the partition unit of FIG. 3B, according to one embodiment of the present invention.
Figure 5A:
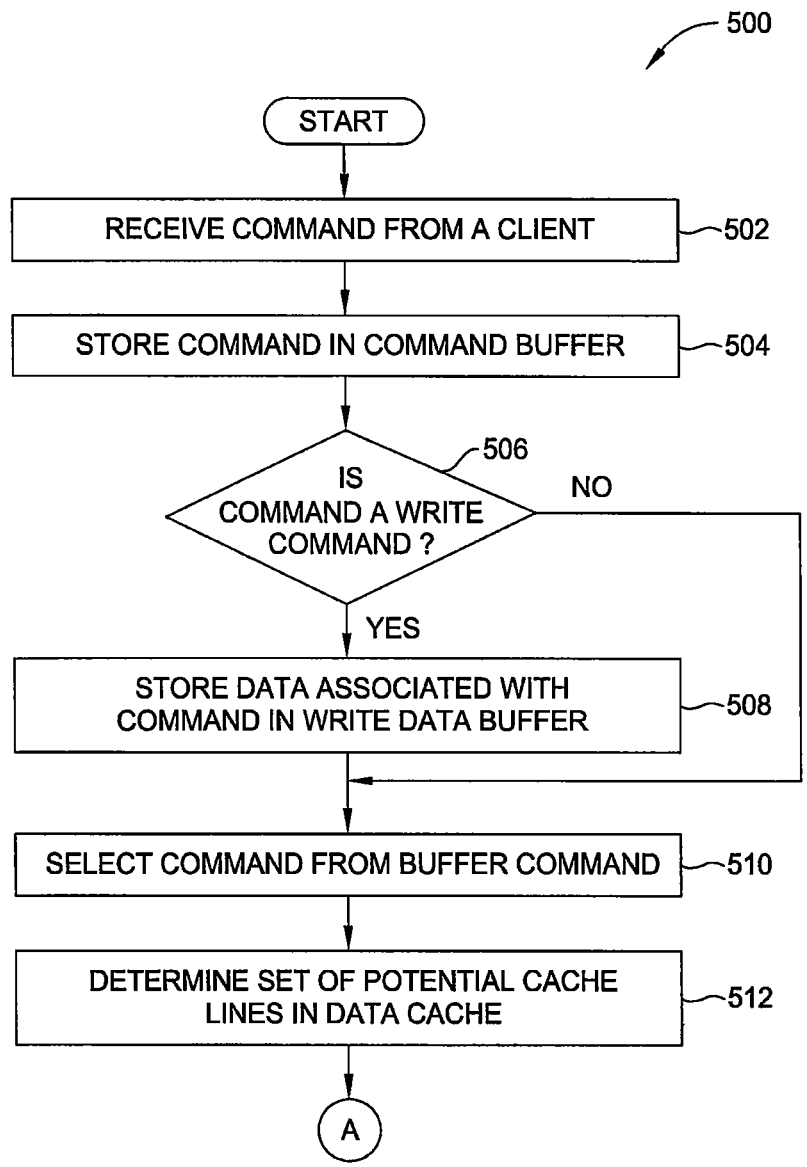
FIGS. 5A-5D set forth a flow diagram of method steps for managing the flow of data in and out of the data cache of FIG. 4, according to one embodiment of the present invention.
Figure 5B:
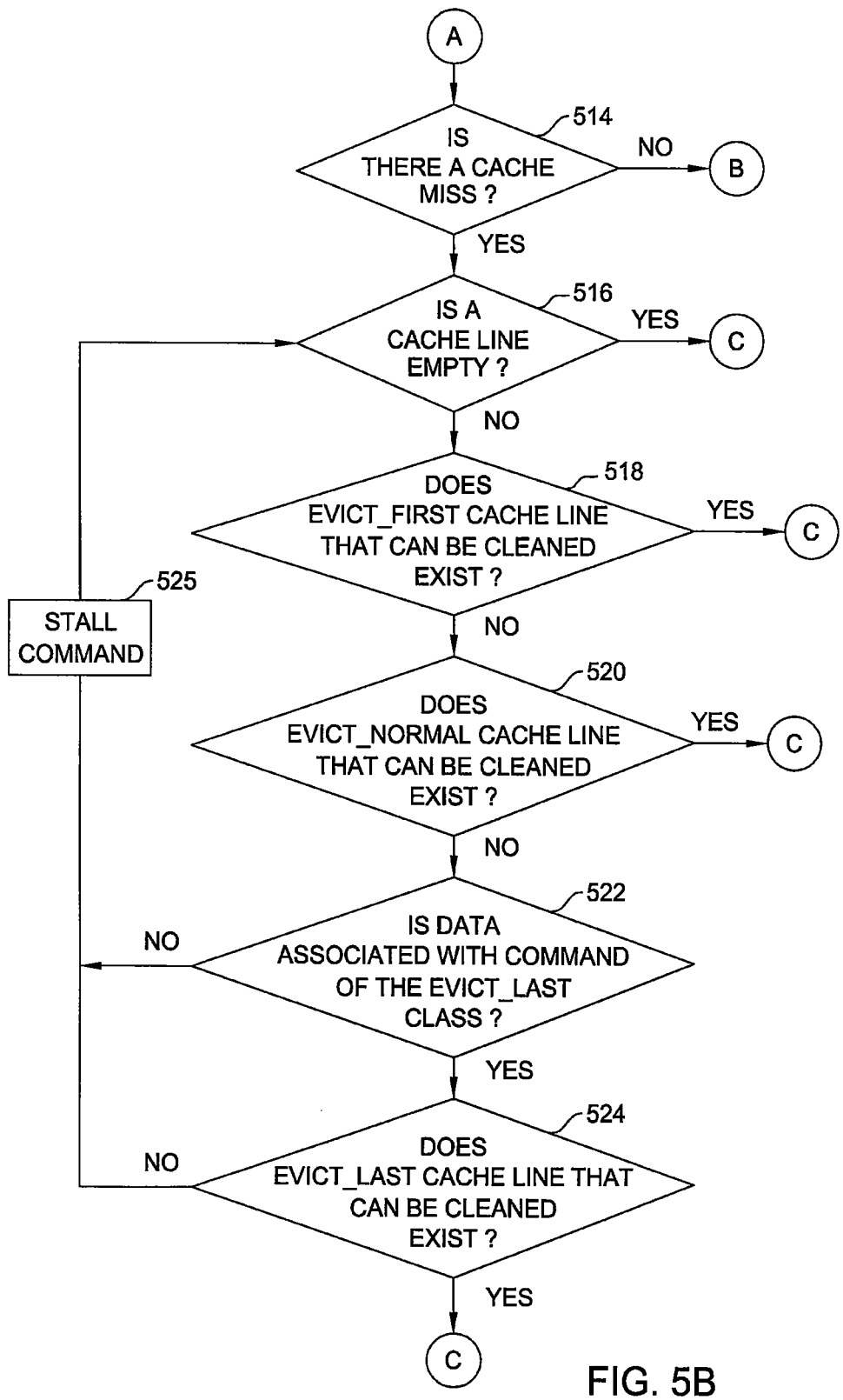
Figure 5C:
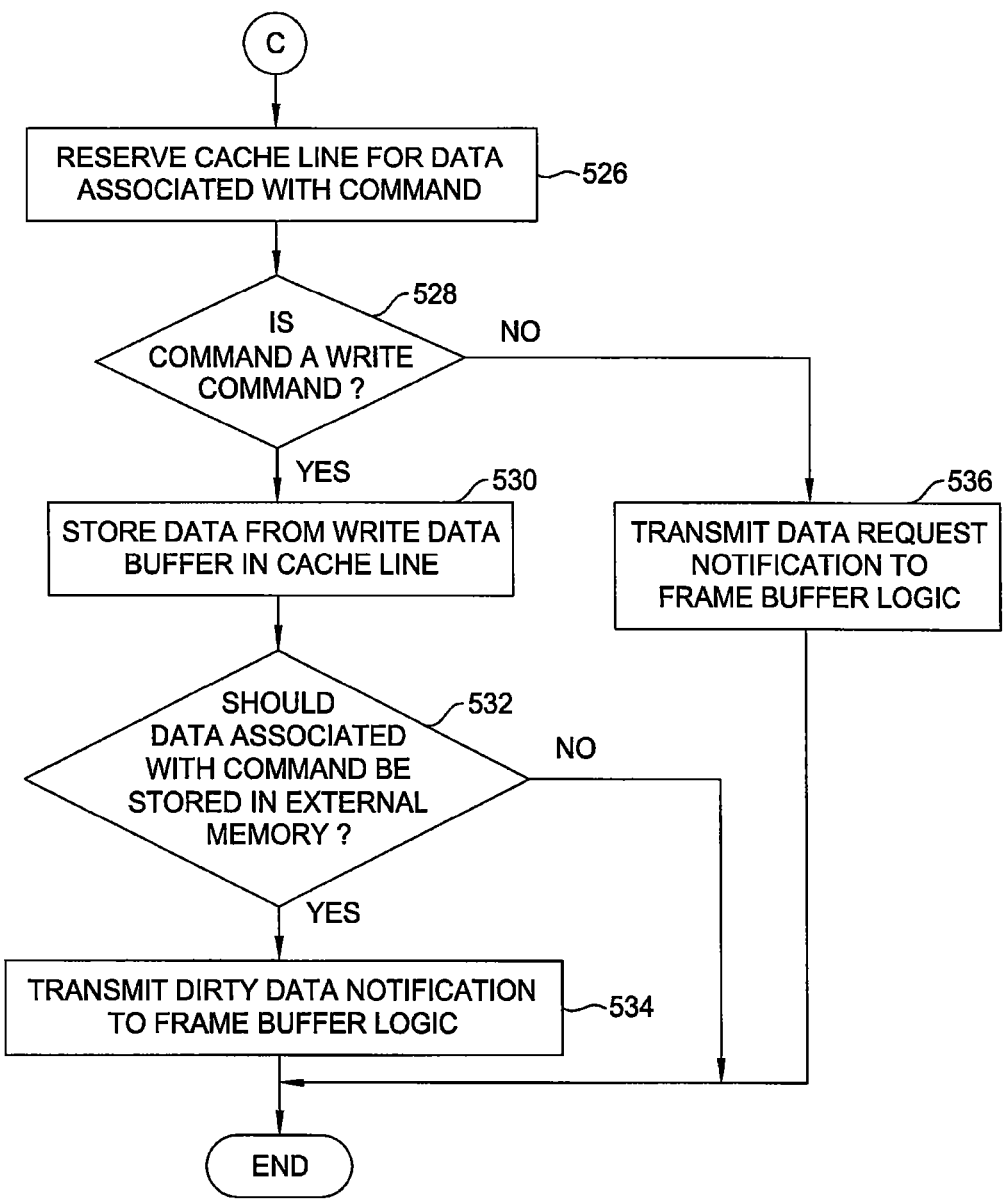
Figure 5D:
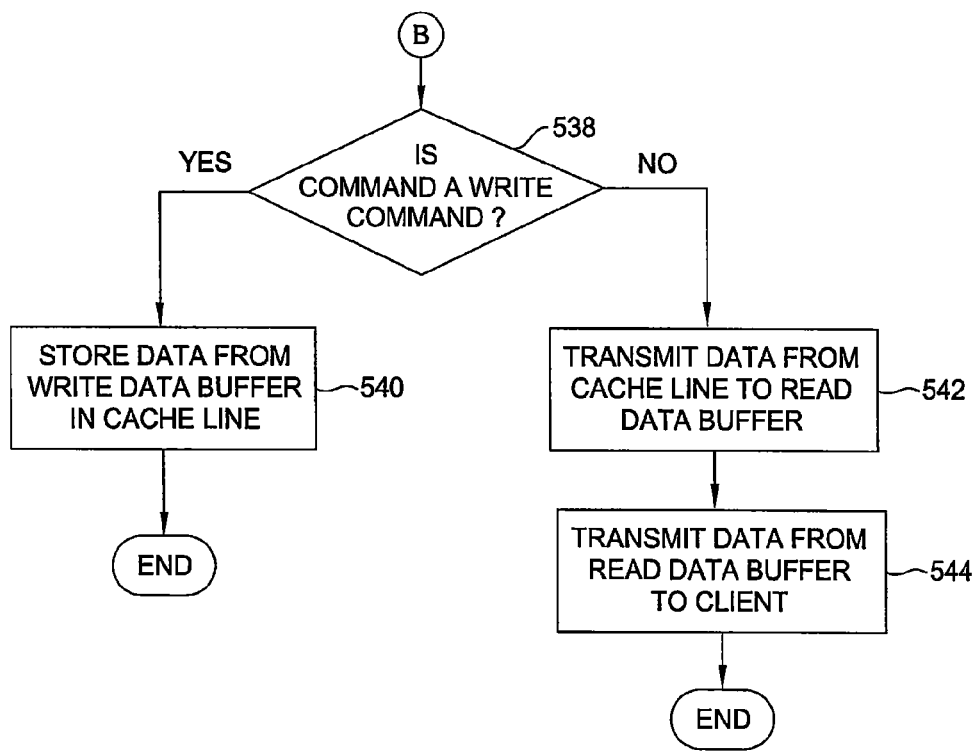

FIG. 4 is a detailed block diagram of the partition unit 215 of FIG. 3B, according to one embodiment of the present invention. As shown, the partition unit 215 includes the L2 cache 350, the FB 355 and the ROP 360. The L2 cache 350 includes an L2 cache slice 402. As described in conjunction with FIG. 3B, the L2 cache 350 may be split into two or more slices for more efficient processing of read and write commands. The L2 cache slice 402 is one such slice of the L2 cache 350. The L2 cache slice 402 includes a crossbar command buffer 404, a ROP command buffer 406, an arbiter 408, a tag look-up unit 410, a tag store 412, a data cache 414, a read data buffer 416 and a write data buffer 418.

In operation, the L2 cache slice 402 receives read and write commands from various clients within the parallel processing subsystem 112, such as the GPCs 208 and the ROP 360. Read and write commands received from the GPCs 208 are transmitted via the crossbar unit 210. In the case of write commands, the data associated with the write command is also transmitted to the L2 cache slice 402.

Each read or write command received by the L2 cache slice 402 includes a memory address associated with a set of cache lines within the data cache 414, where the data associated with the read or write command may be stored. In one embodiment, the data cache 414 is a physically-indexed and tagged 64 KB set associative data cache. The data cache 414 is divided into four segments, where each segment has thirty-two rows and each row having sixteen cache lines of 32 B. A cache line is a physical location within the data cache 414 where data associated with read and write commands is stored. At any given clock cycle, a cache line in the data cache 414 may be empty, may include resident data, or may be reserved for a command that is in progress. In one embodiment of the present invention, due to the size of the data associated with a command, multiple cache lines may need to be reserved to store the data associated with the command. The techniques described herein can be easily extended to data that should be stored in multiple cache lines.

A read or write command received by the L2 cache slice 402 also includes the data class of the data associated with the received command. The data class of the data associated with a command is determined by the client transmitting the particular command and, as described in greater detail herein, reflects the reuse potential of that data within the parallel processing subsystem 112.

The crossbar command buffer 404 is coupled to the crossbar unit 210 and is configured to receive read and write commands from the different GPCs 208 via the crossbar unit 210. The ROP command buffer 406 is coupled to the ROP 360 and is configured to receive read and write commands from the ROP 360. The crossbar command buffer 404 and ROP command buffer 406 are FIFO (first-in-first-out) buffers, that is, the commands received by the command buffers are output in the order the commands are received from the crossbar unit 210 or the ROP 360. The crossbar command buffer 404 and the ROP command buffer 406 are also coupled to the arbiter 408. The arbiter 408 is configured to use standard arbitration techniques to select a given command from the crossbar command buffer 404 or the ROP command buffer 406 and transmit the selected command to the tag look-up unit 410 for processing.

The tag look-up unit 410 is configured to determine whether there is cache line availability in the data cache 414 for the data associated with a command received from the arbiter 408. The tag look-up unit 410 is also configured, where possible, to make cache lines available for data associated with a newly received read or write command by causing data resident in the data cache 414 to be evicted. Once one or more cache lines in the data cache 414 are available for such data, the tag look-up unit 410 is configured to reserve an identified cache line in the data cache 414 for the data associated with the command.

Each cache line in the data cache 414 has a corresponding entry in the tag store 412, and each entry in the tag store includes a state portion, and a tag portion. The state portion of an entry in the tag store indicates the particular state of the cache line corresponding to that entry. The state portion of an entry includes a valid, a dirty bit and a pinned bit. When set, the valid bit indicates that the cache line corresponding to that particular entry stores valid data. When set, the dirty bit indicates that the cache line corresponding to that particular entry stores dirty data. When set, the pinned bit indicates that the cache line corresponding to that particular entry stored pinned data, i.e. data that is currently being used by the L2 cache 350. The tag portion of an entry includes the data class of the data stored within the cache line associated with that particular entry. As previously indicated herein, the cache semantics of the L2 cache 350 are extended to include three data classes: evict_first, evict_normal and evict_last. Data stored within a cache line in the data cache 414 belonging to the evict_first data class typically has little or no reuse potential by any of the clients using the L2 cache 350. Because of the low likelihood of reuse this data can be evicted quickly from the data cache 414 to make room for other data without a high risk of causing subsequent cache misses. Data stored within a cache line in the data cache 414 belonging to the evict_normal data class typically has some reuse potential by the clients using the L2 cache 350. Because of the reuse potential, this data may be evicted at a lower priority than data belonging to the evict_first data class without causing a significant number of subsequent cache misses. Data stored within a cache line in the data cache 414 belonging to the evict_last data class typically has a high reuse potential by the clients using the L2 cache 350. Because of the high likelihood of reuse this data should not be evicted from the data cache 414 to make room for other data as this would result in a high risk of subsequent cache misses. In other embodiments, the L2 cache 350 semantics may be extended to include other data classes based on the requirements of the parallel processing subsystem 112.

Data stored in a cache line is also categorized as "clean" or "dirty," and "pinned" or "unpinned." Stored data is deemed to be clean if the data is coherent with the corresponding data in parallel processing memory 204. Stored data is deemed to be dirty if the data is not coherent with the corresponding data in parallel processing memory 204. As is well known, dirty data should be cleaned prior to being evicted. Unpinned data constitutes data stored in a cache line of data cache 414 that is not currently being used. Pinned data constitutes data stored in a cache line of the data cache 414 that currently being used by the L2. Because pinned data is in use, this data should not be evicted. The valid bit of an entry in the tag store 412 associated with a cache line in the data cache 414 that has resident data is set. The valid bit of an entry in the tag store 412 that is associated with a cache line in the data cache 414 that does not have resident data is cleared.

In the case of read commands, the read data buffer 416 is configured to store data associated with a processed read command received from the data cache 414 until that data is transmitted back to the GPCs 208, via the crossbar unit 210, or the ROP 360, as the case may be. In the case of write commands, the write data buffer 418 is configured to store data associated with a write command received from the GPCs 208, via the crossbar unit 210, or the ROP 360, as the case may be, until that data is transmitted to a corresponding reserved cache line in the data cache 414.

As previously indicated herein, upon receiving a command from the arbiter 408, the tag look-up unit 410 is configured to identify a set of cache lines within the data cache 414 in which the data associated with the received command may potentially be stored. This set of cache lines, referred to herein as the "identified cache lines," is determined based on the memory address included in the read or write command using standard set-associative caching techniques (the memory address indicates the actual location within the parallel processing memory 204 from where the data is read or to where the data is ultimately written). In the case of a read command, the tag look-up unit 410 next determines whether the data associated with the command is currently residing within one of the identified cache lines. If so, meaning that there is a cache hit, then the tag look-up unit 410 causes the requested data to be transmitted from the data cache 414 to the read data buffer 416, where the data is stored until the data is returned to the requesting client. In the case of a write command, the tag look-up unit 410 first determines whether the data associated with the command can be written over data currently residing within one of the identified cache lines. If so, again meaning that there is a cache hit, then the tag look-up unit 410 causes the data associated with the command that is stored in the write data buffer 418 to be written to the associated location of the data cache 414.

In the case of a cache miss, meaning that the data associated with the command is not resident in (in the case of a read command) or cannot be written to (in the case of a write command) one of the identified cache lines, then the tag look-up unit 410 determines whether one of the identified cache lines is empty. If one of the identified cache lines is empty, then the tag look-up unit 410 reserves the empty cache line for the data associated with the read or write command. If none of the identified cache lines is empty, then the tag look-up unit 410 implements a series of cache eviction policies based on the data classes of the data resident in the identified cache lines.

The tag look-up 410 unit first examines the entries in the tag store 412 associated with each of the identified cache lines to determine whether any of the cache lines have resident data that is clean, unpinned and evict_first. The state portion of an entry in the tag store 412 associated with any cache line having resident data that is clean, unpinned and evict_first should have a set valid bit, a clear dirty bit and a clear pinned bit. The tag portion of such an entry should indicate that the data stored in the relevant cache line belongs to the evict_first data class. If any such cache lines exist, then the tag look-up unit 410 causes the least recently used clean, unpinned and evict_first data to be evicted from the data cache 414. After evicting the data, the tag look-up unit 410 reserves the resulting empty cache line for the data associated with the command.

If none of the data residing in the identified cache lines is clean, unpinned and evict_first, then the tag look-up 410 examines the entries in the tag store 412 associated with each of the identified cache lines to determine whether any of the cache lines that have resident data (valid bit is set) that is clean, unpinned and evict_normal. The state portion of an entry in the tag store 412 associated with any cache line having resident data that is clean, unpinned and evict_normal should have a set valid bit, a clear dirty bit and a clear pinned bit. The tag portion of such an entry should indicate that the data stored in the relevant cache line belongs to the evict_normal data class. If any such cache lines exist, then the tag look-up unit 410 causes the least recently used clean, unpinned and evict_normal data to be evicted from the data cache 414. After evicting the data, the tag look-up unit 410 reserves the resulting empty cache line for the data associated with the command.

In one embodiment, if none of the data residing in the identified cache lines is clean, unpinned and evict_first data or clean, unpinned and evict_normal data, then the command is stalled until the data residing in one of the identified cache lines can be evicted from the data cache 414.

In an alternative embodiment, if none of the data residing in the identified cache lines is clean, unpinned and evict_first data or clean, unpinned and evict_normal data, then the tag look-up unit 410 determines whether the data associated with the command belongs to the evict_last data class. If the data associated with the command does not belong to the evict_last data class, then the command is stalled until the data residing in one of the identified cache lines can be evicted from the data cache 414. However, if the data associated with the command belongs to the evict_last data class, then the tag look-up 410 examines the entries in the tag store 412 associated with each of the identified cache lines to determine whether one of the cache lines has resident data that is clean, unpinned and evict_last. The state portion of an entry in the tag store 412 associated with any cache line having resident data that is clean, unpinned and evict_last should have a set valid bit, a clear dirty bit and a clear pinned bit. The tag portion of such an entry should indicate that the data stored in the relevant cache line belongs to the evict_last data class. In one embodiment, if any such cache lines exist, then the tag look-up unit 410 causes the least recently used clean, unpinned and evict_last data to be evicted from the data cache 414. After evicting the data, the tag look-up unit 410 reserves the resulting empty cache line for the data associated with the command.

In other embodiments, if the data belonging to the evict_last data class cannot be evicted from the data cache 414, then the tag look-up unit 410 reclassifies the least recently used clean, unpinned and evict_last data to clean, unpinned and evict_normal data. By changing the data class of the data residing in the relevant cache line, the tag look-up unit 410 is then able to evict that resident data based on the cache eviction policies set forth above. The tag look-up unit 410 then causes the least recently used clean, unpinned, evict_normal data to be evicted from the data cache 414. After evicting the evict_normal data, the tag look-up unit 410 reserves the empty cache line for the data associated with the command, as previously described herein.

To reserve a cache line for the data associated with a command, the tag look-up unit 410 sets the pinned bit within the entry associated with the cache line being reserved. The tag look-up unit 410 then updates the tag portion within the entry associated with the cache line being reserved to reflect the data class of the data associated with the command and the memory address tag of the cache line being reserved. Once the appropriate cache line reserved, for a read command, the tag look-up unit 410 transmits a data request to the FB 355 for the data associated with the read command. The FB 355 transmits the data associated with the read command to the reserved cache line at a future clock cycle. For a write command, the data associated with the write command is transmitted from the write data buffer 418 and stored in the reserved cache line. The tag look-up unit 410 then determines whether the data associated with the write command also should be stored in the parallel processing memory 204 based on the data class of the data. If the data should be stored in the parallel processing memory 204, then the tag look-up unit 410 transmits a dirty data notification to the FB 355. The tag look-up unit 410 also sets the dirty bit within the entry associated with the reserved cache line. In response, the FB 355 transmits the data from the reserved cache line to the parallel processing memory 204 at a future clock cycle. Once the data has been received, the pinned bit is cleared.

In other embodiments, the state portion of an entry in the tag store 422 may be implemented in any technically feasible fashion, including, without limitation, as a single bit to indicate when data in the cache line corresponding to the entry is clean and unpinned. Persons skilled in the art will therefore understand that nothing included in the descriptions herein is intended to limit the scope of the present invention.

In certain embodiments, read commands may be transmitted to the L2 cache slice 402 by the clients within the parallel processing subsystem 112 where the data associated with those commands is retrieved from system memory 104 or a memory associated with another GPU (or PPU) within the computer system 100 and stored temporarily in the data cache 414, as opposed to being retrieved from the parallel processing memory 204 coupled to FB 355, as previously described herein. Similarly, in certain embodiments, write commands may be transmitted to the L2 cache slice 402 by the GPCs 208 or the ROP 360 where the data associated with those commands is temporarily stored in the data cache 414 before being written to system memory 104 or a memory associated with another GPU (or PPU) within the computer system 100, as opposed to being written to the parallel processing memory 204 coupled to FB 355, as previously described herein. In all such embodiments, the manner in which the data associated with the read or write commands is cached in and evicted from the data cache 414, as described herein, remains unchanged. Thus, all such embodiments fall within the scope of the present invention.

FIG. 5A-5D set forth a flow diagram of method steps for managing the flow of data in and out of the data cache 414 of FIG. 4, according to one embodiment of the present invention. Although the method steps are described in conjunction with FIGS. 1-4, persons skilled in the art will understand that any system configured to perform the method steps, in any order, falls within the scope of the present invention.

The method 500 begins at step 502, where the L2 cache slice 402 receives a read or write command from a client within the system 100. As described in conjunction with FIG. 4, each command received by the L2 cache slice 402 includes a memory address that is associated with a set of cache lines located within the data cache 414, where the data associated with the command may be stored. A command received by the L2 cache slice 402 also includes the data class of the data associated with the command. At step 504, the command is stored in crossbar command buffer 404 or the ROP command buffer 406, as the case may be.

At step 506, if the command is a write command, then the method 500 proceeds to step 508 where the data associated with the command is received by the L2 cache slice 402 and stored in the write data buffer 418. At step 506, if the command is a read command then the method 500 proceeds directly to step 510. At step 510, the command received by the L2 cache slice 402 in step 502 is selected by the arbiter 408 using standard arbitration techniques and transmitted to the tag look-up unit 410 for processing.

At step 512, the tag look-up 410 unit identifies the set of cache lines in the data cache 414 where the data associated with the selected command may be stored based on the memory address included in the command and using set-associative caching techniques. Again, this set of cache lines is referred to as the "identified cache lines." At step 514, the tag look-up unit 410 determines whether there is a cache miss. There is a cache miss if the data associated with the command is not currently residing within one of the identified cache lines. In the case of a cache miss the method step 500 proceeds to step 516.

At step 516, the tag look-up unit 410 determines whether one of the identified cache lines is empty (meaning the cache line is currently available). If none of the identified cache lines is empty (meaning the cache line is currently dirty or pinned), then the method 500 proceeds to step 518. At step 518, the tag look-up unit 410 examines the tags in the tag store 412 corresponding to the identified cache lines to determine which of those cache lines, if any, have resident data that is clean, unpinned and of the evict_first data class. If none of the cache lines has resident data that is clean, unpinned and of the evict_first data class, then the method 500 proceeds to step 520. At step 520, the tag look-up unit 410 examines the tags in the tag store corresponding to the identified cache lines to determine which of those cache lines, if any, have resident data that is clean, unpinned and of the evict_normal data class. If none of the cache lines has resident data that is clean, unpinned and evict_normal, then the method 500 proceeds to step 522.

At step 522, the tag look-up unit 410 examines the data class included in the command to determine whether the data associated with the command is of the evict_last data class. If the data class of the data associated with the command is of the evict_last data class, then the method 500 proceeds to step 524, where the tag look-up unit 410 examines the tags in the tag store 412 corresponding to the identified cache lines to determine which of those cache lines, if any, have resident data that is clean, unpinned and of the evict_last data class. If one or more of the identified cache lines have resident data that is clean, unpinned and of the evict_last data class, then the cache line having the least recently used resident data that is clean, unpinned and of the evict_last class is selected for eviction.

At step 526, the tag look-up unit 410 reserves the selected cache line for the data associated with the command. As described in conjunction with FIG. 4, to reserve a cache line for the data associated with a command, the tag look-up unit 410 sets the valid bit portion within the entry associated with the selected cache line. The tag look-up unit then updates the tag portion within the entry associated with the selected cache line to reflect the data class of the data associated with the command.

At step 528, the tag look-up unit 410 determines whether the command is a write command. If the command is a write command, then the method 500 proceeds to step 530, where the data associated with the write command is transmitted from the write data buffer 418 to the reserved cache line. At step 532, the tag look-up unit 410 analyzes the data class of the data associated with the command to determine whether the data should be transmitted to the external memory for storage. In one embodiment, data of evict_last data class is queued data and should not be transmitted to the external memory for storage, while data of the evict_first and evict_normal data class should be transmitted to the external memory for storage. If the data should be transmitted to the external memory for storage, then at step 534, the tag look-up unit 410 transmits a dirty data notification to the frame buffer logic 355. The frame buffer logic 355 in turn transmits the dirty data to the external memory at an efficient clock cycle. If, at step 532, the tag look-up unit 410 determines that the data should not be transmitted to the external memory for storage, then the method 500 ends.

Referring back now to step 530, if the command is a read command, then the method 500 proceeds to step 536, where the tag look-up unit 410 transmits a data request notification to the frame buffer logic 355. The frame buffer logic 355 in turn transmits the requested data to the cache line reserved at step 526 at an efficient clock cycle. The method 500 then ends.

Referring back now to step 524, if none of the cache lines have resident data that is clean, unpinned and of the evict_last data class, then the command is stalled at step 525, and the method 500 returns to step 516, previously described herein. Similarly, referring back to step 522, if the data class of the data associated with the command is not evict_last, then the command is stalled at step 525, and the method 500 returns to step 516, previously described herein.

Referring back now to step 520, if one or more of the identified cache lines have resident data that is clean, unpinned and of the evict_normal data class, then the cache line having the least recently used resident data that is clean, unpinned and of the evict_normal data class is selected for eviction. The method 500 then proceeds directly to step 526, previously described herein. Similarly, referring back to step 518, if one or more of the identified cache lines have resident data that is clean, unpinned and of the evict_first data class, then the cache line having the least recently used resident data that is clean, unpinned and of the evict_first data class is selected for eviction. The method 500 then proceeds directly to step 526, previously described herein.

Referring back now to step 516, if a cache line in the data cache 414 is available then the method 500 proceeds directly to step 528, previously described herein. Finally, referring back to step 514, if there is a cache hit (as opposed to a cache miss), then the method 500 proceeds directly to step 538. At step 538, the tag look-up unit 410 determines whether the command is a write command. If the command is a write command, then the method 500 proceeds to step 540, where the data associated with the write command is transmitted from the write data buffer 418 to the already reserved cache line. If at step 538, the command is a read command, then, at step 542, the tag look-up unit 410 causes the data stored in the already reserved cache line to the read data buffer 416. At step 544, the data from the read data buffer 416 is transmitted to the client that transmitted the read command at step 502.

In sum, each read or write command transmitted by a client to the L2 cache slice includes a memory address and the data class of the data associated with that particular command. The tag look-up unit within the L2 cache slice analyzes the memory address included in such a command to determine the set of potential cache lines in which the data associated with the command may be stored. The tag look-up unit also analyzes the tags, stored in the tag store, that are associated with each of the potential cache lines to identify at least one cache line that may be reserved for the data associated with the command. If one of the potential cache lines is empty, then the tag look-up unit reserves that cache lines for the requested or written data. When reserving a cache line for a particular command, the tag look-up unit stores the data class of the data associated with the command in the tag portion of the entry within the tag store that corresponds to that cache line.

However, if none of the identified cache lines is empty, then the tag look-up unit determines if any of the identified cache lines has resident data that is clean, unpinned, and belonging to the evict_first data class. If the data in one or more of the identified lines meets all of these criteria, then the tag look-up unit causes the least recently used clean, unpinned, evict_first data to be evicted and reserves the associated cache line for the requested or written data. If none of the data in the identified cache lines meets all of these criteria, then the tag look-up unit determines if any of the identified cache lines has resident data that is clean, unpinned, and belonging to the evict_normal data class. If the data in one or more of the identified lines meets all of these criteria, then the tag look-up unit causes the least recently used clean, unpinned, evict_normal data to be evicted and reserves the associated cache line for the requested or written data. If none of the data in the identified cache lines meets all of these criteria, then the read or write command is stalled until the data in one of the identified lines can be evicted.

Advantageously, the data class associated with the data stored in the data cache allows the tag look-up unit to evict data that is has the least likelihood for reuse when making room for the data associated with a read or write command. This mechanism of evicting data reduces the number of cache misses resulting from the early eviction of data that may be reused by clients within a system. In addition, the data cache may be used to store data that is frequently reused but does not need to be transmitted to the external memory by attaching the appropriate data class to that data. This eliminates the need for additional data storage structures to store that data.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for evicting data from an intermediary cache coupled to one or more clients and to an external memory, the method comprising:

receiving a command from a client that includes an associated memory address, wherein the client determines that data associated with the command belongs to a first eviction class;

identifying, based on the memory address, one or more cache lines within the intermediary cache to store the data associated with the command;

determining that there is a cache miss relative to the one or more cache lines; and causing at least part of the data residing in the one or more cache lines to be evicted, or stalling the command, based on the first eviction class and a plurality of eviction classes associated with the data residing in the one or more cache lines, wherein each eviction class reflects a different likelihood that data associated with the eviction class will be reused by the client or a different client, and wherein data residing in the one or more cache lines and associated with an evict-first eviction class is evicted from the one or more cache lines with a higher priority than data residing in the one or more cache lines and associated with an evict-normal eviction class, and data residing in the one or more cache lines and associated with the evict-normal eviction class is evicted from the one or more cache lines with a higher priority than data residing in the one or more cache lines and associated with an evict-last eviction class.

2. The method of claim 1, wherein a first portion data resides in the one or more cache lines that belongs to the evict-first eviction class, and further comprising the step of determining whether any of the first portion of data is clean and unpinned.

3. The method of claim 2, wherein at least some of the first portion of data is clean and unpinned, and the step of causing comprises causing the least recently used, clean, unpinned, evict-first data to be evicted from the one or more cache lines.

4. The method of claim 1, wherein a first portion of data resides in the one or more cache lines that belongs to the evict-normal eviction class, and further comprising the step of determining whether any of the first portion of data is clean and unpinned.

5. The method of claim 4, wherein at least some of the first portion of data is clean and unpinned, and the step of causing comprises causing the least recently used, clean, unpinned, evict-normal data to be evicted from the one or more cache lines.

6. The method of claim 1, further comprising the step of determining whether the data associated with the command belongs to the evict-last eviction class.

7. The method of claim 6, wherein the data associated with the command belongs to the evict-last eviction class, and a first portion of data resides in the one or more cache lines that belongs to the evict-last eviction class, and further comprising the step of determining whether any of the first portion of data is clean and unpinned.

8. The method of claim 7, wherein at least some of the first portion of data is clean and unpinned, and the step of causing comprises causing the least recently used, clean, unpinned, evict-last data to be evicted from the one or more cache lines.

9. The method of claim 7, wherein the first portion of data is dirty or pinned, and the command is stalled.

10. The method of claim 6, wherein the data associated with the command does not belong to the evict-last eviction class, and the command is stalled.

11. The method of claim 1, wherein a first portion of data resides in the one or more cache lines that belongs to the evict-last eviction class, and further comprising the step of reclassifying a least recently used part of the first portion of data as belonging to the evict-normal eviction class, and wherein the step of causing comprises causing the least recently used, clean and unpinned part of the first portion of data to be evicted from the one or more cache lines.

12. The method of claim 1, wherein the step of causing further comprises transmitting a clean notification to frame buffer logic for the at least part of the data residing in the one or more cache lines, and further comprising the step of reserving at least one cache line associated with the at least part of the data residing in the one or more cache lines for the data associated with the command.

13. The method of claim 1, wherein the first eviction class is determined by the client based on the likelihood that data associated with the command will be reused by the client or a different client.

14. A system for evicting data from an intermediary cache coupled to one or more clients and to an external memory, the system comprising:

one or more data cache units;

a tag store unit configured to store a different entry for each of a plurality of cache lines associated with the one or more data cache units, wherein each entry includes a tag indicating an eviction class associated with data stored in the cache line corresponding to the entry and a state portion indicating whether the data in the cache line corresponding to the entry is clean and unpinned, and wherein the eviction class indicates the likelihood that the data stored in the cache line corresponding to the entry will be reused by the one or more clients;

a tag look-up unit coupled to the one or more data cache units and to the tag store unit and configured to:

receive a command from a client that includes an associated memory address, wherein the client determines that data associated with the command belongs to a first eviction class, identify, based on the memory address, one or more cache lines within the one or more data cache units to store the data associated with the command, determine that there is a cache miss relative to the one or more cache lines, and cause data residing in at least one of the one or more cache lines to be evicted based on the first eviction class and the eviction class associated with the data stored in the at least one cache line included in the entry in the tag store unit corresponding to the at least one cache line, wherein data residing in the one or more cache lines and associated with an evict-first eviction class is evicted from the one or more cache lines with a higher priority than data residing in the one or more cache lines and associated with an evict-normal eviction class, and data residing in the one or more cache lines and associated with the evict-normal eviction class is evicted from the one or more cache lines with a higher priority than data residing in the one or more cache lines and associated with an evict-last eviction class.

15. The system of claim 14, wherein the state portion includes a valid flag, a dirty flag, and a pinned flag.

16. The system of claim 14, wherein the tag included in the entry in the tag store unit corresponding to the at least one cache line indicates that the data stored in the at least one cache line belongs to the evict-first eviction class, the state portion included in the entry indicates that data stored in the at least one cache line is clean and unpinned, and the tag look-up unit is configured to determine that the data in the at least one cache line is the least recently used, clean, unpinned, evict-first data in the one or more cache lines and then cause the data in the at least one cache line to be evicted.

17. The system of claim 14, wherein the tag included in the entry in the tag store unit corresponding to the at least one cache line indicates that the data stored in the at least one cache line belongs to the evict-normal eviction class, the state portion included in the entry indicates that data stored in the at least one cache line is clean and unpinned, and the tag look-up unit is configured to determine that the data in the at least one cache line is the least recently used, clean, unpinned, evict-normal data in the one or more cache lines and then cause the data in the at least one cache line to be evicted.

18. The system of claim 14, wherein the tag look-up unit is configured to determine that the data associated with the command belongs to the evict-last eviction class, the tag included in the entry in the tag store unit corresponding to the at least one cache line indicates that the data stored in the at least one cache line belongs to the evict-last eviction class, the state portion included in the entry indicates that data stored in the at least one cache line is clean and unpinned, and the tag look-up unit is configured to determine that the data in the at least one cache line is the least recently used, clean, unpinned, evict-last data in the one or more cache lines and then cause the data in the at least one cache line to be evicted.

19. The system of claim 14, wherein the data stored in the at least one cache line belongs to the evict-last eviction class, and the tag look-up unit is configured to reclassify the data as belonging to the evict-normal eviction class, and wherein the state portion included in the entry in the tag store unit corresponding to the at least one cache line indicates that data stored in the at least one cache line is clean and unpinned, and the tag look-up unit is further configured to determine that the data in the at least one cache line is the least recently used, clean, unpinned, evict-normal data in the one or more cache lines and then cause the data in the at least one cache line to be evicted.

20. The system of claim 14, wherein tag look-up unit is further configured to transmit a clean notification to frame buffer logic for the data residing in the at least one cache line and to reserve the at least one cache line for the data associated with the command.

21. A computing device, comprising:
one or more clients;
an intermediary cache that includes:
one or more data cache units,
a tag store unit configured to store a different entry for each of a plurality of cache lines associated with the one or more data cache units, wherein each entry includes a tag indicating an eviction class associated with data stored in the cache line corresponding to the entry and a state portion indicating whether the data in the cache line corresponding to the entry is clean and unpinned, and wherein the eviction class indicates the likelihood that the data stored in the cache line corresponding to the entry will be reused by the one or more clients, and
a tag look-up unit coupled to the one or more data cache units;
an external memory coupled to the intermediary cache; and
a crossbar unit that couples the one or more clients to the intermediary cache,
wherein the tag look-up unit is configured to:
receive a command from a client that includes an associated memory address, wherein the client determines that data associated with the command belongs to a first eviction class,
identify, based on the memory address, one or more cache lines within the one or more data cache units to store the data associated with the command,
determine that there is a cache miss relative to the one or more cache lines, and
cause data residing in at least one of the one or more cache lines to be evicted based on the first eviction class and the eviction class associated with the data stored in the at least one cache line included in the entry in the tag store unit corresponding to the at least one cache line,
wherein data residing in the one or more cache lines and associated with an evict-first eviction class is evicted from the one or more cache lines with a higher priority than data residing in the one or more cache lines and associated with an evict-normal eviction class, and data residing in the one or more cache lines and associated with the evict-normal eviction class is evicted from the one or more cache lines with a higher priority than data residing in the one or more cache lines and associated with an evict-last eviction class.

* * * * *